(12) United States Patent
Winker et al.

(10) Patent No.: US 7,757,586 B2
(45) Date of Patent: Jul. 20, 2010

(54) DEVICE AND METHOD FOR MAKING A SCREWED CONNECTION BETWEEN A FIRST COMPONENT AND AT LEAST ONE FURTHER COMPONENT

(75) Inventors: Alexander Winker, Spaichingen (DE); Florian Koeniger, Schweinfurt (DE); Rainer Breitenbach, Gochsheim (DE)

(73) Assignees: Winker Massivumformung GmbH & Co. KG, Spaichingen (DE); Schaeffler KG, Schweinfurt (DE)

( * ) Notice: Subject to any disclaimer, the term of this patent is extended or adjusted under 35 U.S.C. 154(b) by 220 days.

(21) Appl. No.: 11/885,725

(22) PCT Filed: Jan. 26, 2006

(86) PCT No.: PCT/EP2006/000649
§ 371 (c)(1), (2), (4) Date: Sep. 4, 2007

(87) PCT Pub. No.: WO2006/092191
PCT Pub. Date: Sep. 8, 2006

(65) Prior Publication Data
US 2009/0003963 A1    Jan. 1, 2009

(30) Foreign Application Priority Data
Mar. 1, 2005    (DE) .................. 10 2005 009 879

(51) Int. Cl.
*B25B 21/00* (2006.01)
(52) U.S. Cl. ......................................................... 81/54
(58) Field of Classification Search ............... 81/54, 81/55, 57.38, 57.42, 13; 29/525.01
See application file for complete search history.

(56) References Cited

U.S. PATENT DOCUMENTS 1,270,766 A * 7/1918 Armstrong .................... 81/55
1,382,320 A * 6/1921 Riley et al. .................... 81/55

(Continued)

FOREIGN PATENT DOCUMENTS

DE    19543436 A1    5/1997

(Continued)

*Primary Examiner*—David B Thomas
(74) *Attorney, Agent, or Firm*—Kriegsman & Kriegsman (57) ABSTRACT

The invention relates to a device (10, 30) which is used to produce a screw connection between a first component (14, 60) and at least one additional component (15, 70), by means of a fixing screw (12) or a fixing groove (50, 55) and a corresponding fixing element (16, 73). Said device (10, 30) comprises a rotationally mounted tool (11, 31), wherein the fixing screw (12) and/or the fixing groove (50, 55) is maintained in a manner that prevents it from rotating and in an axially fixed manner and wherein the head (20) of the fixing screw (12) and/or the fixing groove (50, 55) is maintained at a distance (S) in relation to the first component (14, 60) as long as both components (14, 60; 15, 70) are joined together. According to the invention, at least one energy accumulator (18, 48) is provided between the tool (11, 31) and the first component (14, 60). At least the joining force and the maximum and the total desired clamping force of the prepared screw connection can be predetermined by means of the at least one energy accumulator (18, 48). The invention also relates to a fixing groove (50, 55) for the inventive device and/or the inventive method.

19 Claims, 10 Drawing Sheets

U.S. PATENT DOCUMENTS

| | | | |
|---|---|---|---|
| 3,789,705 A * | 2/1974 | Naslund | 81/13 |
| 4,503,736 A * | 3/1985 | Fushiya et al. | 81/55 |
| 5,406,867 A * | 4/1995 | Junkers et al. | 81/57.38 |
| 5,408,509 A * | 4/1995 | Ruzga et al. | 376/260 |
| 5,964,128 A * | 10/1999 | Kaneyama et al. | 81/56 |
| 6,065,737 A * | 5/2000 | Richardson et al. | 254/29 A |
| 6,247,384 B1 * | 6/2001 | Kusu et al. | 81/54 |
| 6,880,433 B1 * | 4/2005 | Tanimura | 81/64 |
| 7,066,699 B2 * | 6/2006 | Gosling | 411/14.5 |
| 2004/0177724 A1 * | 9/2004 | Pettit, Jr. | 81/55 |
| 2005/0165397 A1 * | 7/2005 | Faus et al. | 606/61 |

FOREIGN PATENT DOCUMENTS

| | | |
|---|---|---|
| DE | 10355684 A1 | 6/2005 |
| FR | 1265371 A | 6/1961 |

* cited by examiner

DEVICE AND METHOD FOR MAKING A SCREWED CONNECTION BETWEEN A FIRST COMPONENT AND AT LEAST ONE FURTHER COMPONENT

DESCRIPTION

This invention relates to a device for making a screwed connection between a first component and at least one further component by means of a fastening screw of a fastening nut and a corresponding fastening element, wherein the device has a rotatably mounted tool, in which the fastening screw or fastening nut is retained so that it cannot rotate and is axially fixed, and in which the head of the fastening screw of the fastening nut is retained at a distance from the first component until both components are joined together. This invention also relates to a method for making such a connection by means of a fastening screw or a fastening nut and a corresponding fastening element, wherein the fastening element is pulled onto the fastening screw or tightened into the fastening nut by rotating the fastening screw or fastening nut until the two components are joined together, wherein the head of the fastening screw or the fastening nut is retained at a distance from the first component, and the fastening screw of the fastening nut is then tightened until it bears against the first component.

In conventional methods the components to be connected are joined together and clamped when the components and the fastening screw or fastening nut are fitted. This means that the clamping force resulting from the torque applied is reduced by the frictional forces generated during joining (thread friction on the one hand and head friction on the other). These frictional forces cannot be accurately quantified. In addition, the head friction already generated during the joining process results in a variation in component area, which may even cause destruction. Consequently the coefficient of friction of the screwed connection is varied uncontrollably. The resultant clamping force cannot therefore be accurately determined but can only be estimated.

For this reason screwed connections must, in case of doubt, be dimensioned larger than is actually required for safety reasons, e.g. in vehicle manufacture, in order to guarantee the required clamping force. These screwed connections are therefore also heavier than required, giving rise to a weight disadvantage.

A generic device and generic method are disclosed in the unpublished German patent application 103 55 684.2. The generic method provides that the joining force to be applied for joining together two components by means of a screwed connection and the clamping force to be applied for clamping the components become active one after the other in time. When the joining force is applied the fastening screw or fastening nut does not bear against the component, so that the head friction is eliminated and the component surface is not impaired or even destroyed during the joining process. The coefficient of friction is therefore more easily controllable and ideally remains essentially unchanged. The size of the clamping force during the actual clamping can therefore be better estimated.

The generic device is characterised in that it has a rotatably arranged tool in which the fastening nut or the fastening screw is retained in a rotatably fixed manner and separated from the first component during the joining of the components. The screwed connection is not clamped until the two components bear against each other.

However, an uncertainty factor remains even in this case because the size of the clamping force can still only be estimated. The end of the process of joining the components cannot be precisely defined either. Although the torque increases when the joining is completed, this point is difficult to detect. Moreover, the making of the screwed connection cannot be automated with the generic tool because the actual screwing process must be interrupted once.

The object of this invention therefore consists in providing a method and a device of the above-mentioned type which at least further reduce this uncertainty factor and allow automation of the screwing process.

The solution consists in a device for making a screwed connection between the first component and at least one further component by means of a fastening screw of a fastening nut and a corresponding fastening element, wherein the device has a rotatably mounted tool, in which the fastening screw or fastening nut is retained so that it cannot rotate and is axially fixed, and in which the head of the fastening screw of the fastening nut is retained at a distance from the first component until both components are joined together, characterised in that at least one force accumulator is provided between the tool and the first component. The solution also consists in a method for making a screwed connection between a first component and at least one further component by means of a fastening screw or a fastening nut and a corresponding fastening element, wherein the fastening element is pulled onto the fastening screw or tightened into the fastening nut by rotating the fastening screw or fastening nut until the two components are joined together, wherein the head of the fastening screw or the fastening nut is retained at a distance from the first component, the fastening screw of the fastening nut is then tightened until it bears against the first component, characterised in that at least the joining force of the finished screwed connection is predetermined by means of a force accumulator.

According to the invention provision for a force accumulator to be provided between the tool and the first component. The method according to the invention is characterised in that at least the joining force between the fastening nut or the fastening screw and the first component is predetermined by means of a force accumulator. A further object of this invention is a fastening nut for the device according to the invention and the method according to the invention wherein the force transmitted to the finished screwed connection from the force accumulator corresponds to the required clamping force of the screwed connection.

If the components are joined together by rotating a fastening nut, the corresponding fastening element is tightened in the nut. Similarly, the corresponding fastening element is tightened to the fastening screw when a fastening screw is rotated. In any case the fastening nut or fastening screw is not moved axially relative to the tool and relative to the components. The fastening nut or the head of the fastening screw is instead kept at a distance from the first component. This distance is essentially constant but can obviously also fluctuate during the joining of the components, e.g. due to impacts from outside, or due to structural influences of the force accumulator, but without shrinking to zero. The size of the distance depends in this case on the dimensioning of the device according to the invention and the parts to be joined. Exemplary values are approximately 0.2 to 1.5 mm.

The force accumulator between the tool and the first component initially serves to maintain this distance. The force accumulator is set and dimensioned so that the distance is maintained at least until the two components are joined together without the accumulator force of the force accumulator being exceeded. Instead the accumulator force which is required to join together the components is at least equal to the joining force. When the fastening nut or fastening screw is further rotated after joining, the force introduced is greater than the accumulator force. The force accumulator is then compressed until the fastening nut or the head of the fastening screw bears against the first component. The screwed connection is then clamped. The connection between the fastening nut or fastening screw on the one hand and the tool on the other is then loosened.

In other words: at least the desired joining force of the screwed connection can be predetermined by suitable dimensioning and setting of the force accumulator. Therefore the clamping force of the screwed connection, which is applied during subsequent clamping, can also be better estimated. Previously this was not possible. The problem of detecting the end of the joining process is also avoided by presetting the joining force because this end is predefined by presetting the joining force. Finally, the actual screwing process can be carried out without interruption until the screwed connection is clamped. In principle the method according to the invention can therefore be automated.

A further advantage consists in the fact that because the fastening nut or fastening screw is separated from the first component during the joining of the components, there are no further smoothing effects. In other words: the release moments are increased and can even be specifically increased by machining (for example roughening or introducing a ribbed contact surface) the surface of the first component and/or of the fastening nut or head of the fastening screw. This therefore prevents unintentional loosening of the screwed connection.

The fastening nut according to the invention, with an outer polygon and a clamping shoulder adjacent to the outer polygon, is comparatively simple to produce, e.g. by pressing or turning an annular groove, and resists the loads generated in the device according to the invention.

Advantageous further developments are described in the dependent claims.

The at least one force accumulator is preferably designed as a device that can be compressed and expanded in a force-dependent manner in the direction of joining of the components by distance S. Such a force accumulator is therefore variable in length. This length variation takes place in the direction in which the components to be joined move towards each other. The at least one force accumulator may be designed as a mechanically, hydraulically or pneumatically operating device. Examples of a mechanically operating device are spring or friction accumulators, a spring accumulator preferably having at least one spring element, or at least one compression spring. Obviously combinations of different accumulators are also conceivable.

At least the joining force, in the maximum case the total required clamping force of the finished screwed connection, can be predetermined by the construction or design of the force accumulator. In the latter case the force stored in the force accumulator is transmitted as the clamping force to the finished screwed connection.

In particular, the predetermination of the clamping force enables screwed connections to be dimensioned according to the requirements and at the same time to meet all the safety requirements reliably. For safety reasons overdimensioning of the screwed connections is no longer required.

If the at least one force accumulator is designed, for example, as a hydraulically or pneumatically operating device, the device according to the invention may also be used as a force measuring device. Here the force introduced is measured on the basis of the pressure. This represents an external measurement, i.e. no load cell is required inside the screwed connection. This prevents falsifications of the measured values.

Exemplary embodiments of this invention are described in further detail in the following with reference to the attached drawings.

Figure 1:
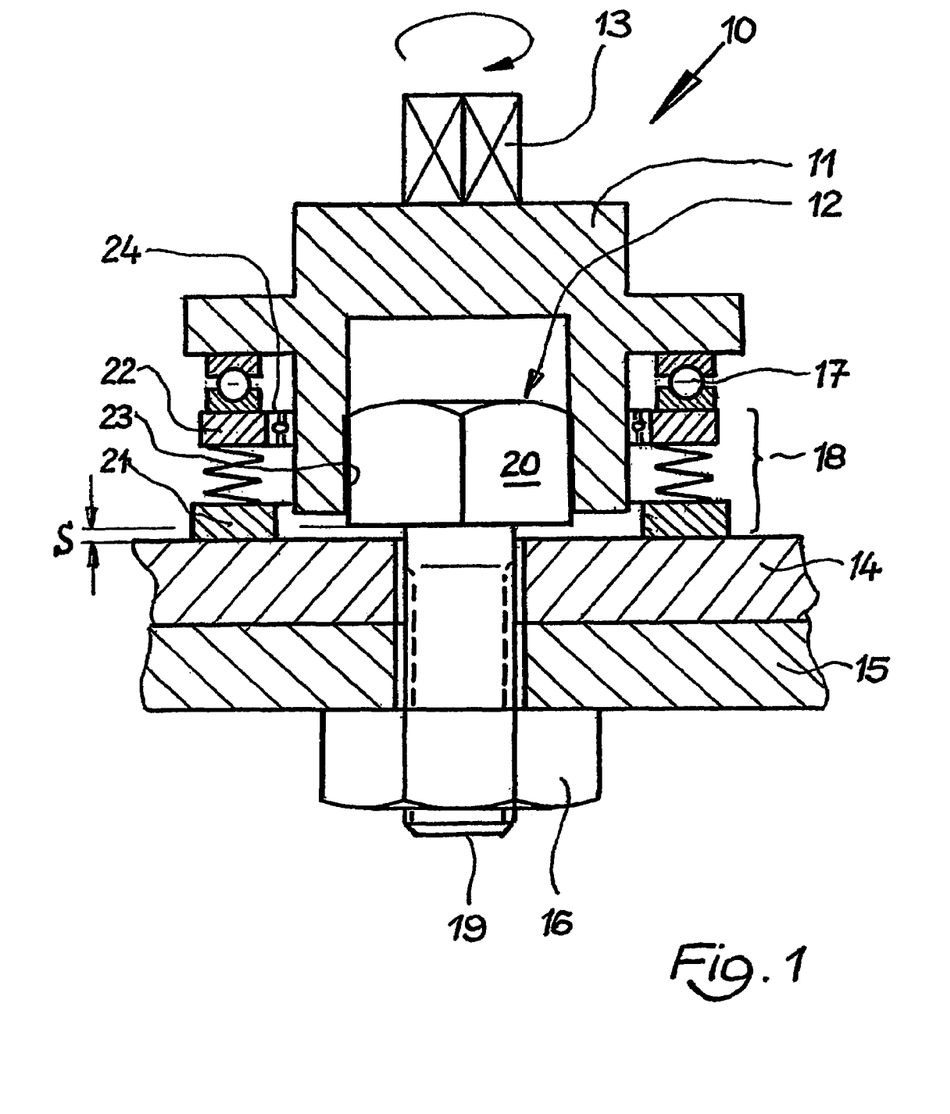
FIG. 1 shows a first exemplary embodiment of the device according to the invention in section in a diagrammatic representation not to scale.

FIG. 1 shows a first exemplary embodiment of device 10 according to the invention in an explanatory representation. Device 10 comprises a tool 11 in which a fastening screw 12 (or a fastening nut, not shown here) is retained in a rotatably fixed and axially fixed manner in a retaining region 23. This can be achieved by any suitable method, e.g. by clamps (clamping elements, clamping pliers, etc.), by hydraulically or pneumatically acting devices, or by magnets for example. By applying a torque to tool 11a polygon 13 is provided. For this purpose another suitable, e.g. hydraulically or pneumatically acting device can obviously be provided. Fastening screw 12 (or the fastening nut) serves to make a screwed connection between a first component 14 and a second component 15. For this purpose a corresponding fastening element, for example, as shown, a nut 16 or any fastening element with a female thread, is provided. In the exemplary embodiment tool 11 is supported by an axial bearing 17, a bearing flange 22, a force accumulator 18 and a support flange 21 on the first component 14. Bearing flange 22 is mounted by means of a bearing 24 on tool 11. Force accumulator 18 is denoted as a spring, i.e. as a mechanical force accumulator. Obviously any other suitable, for example hydraulically or pneumatically acting force accumulator is also suitable.

The screwed connection made by means of fastening screw 12 and nut 16 will keep both components 14, 15 together with a certain clamping force.

When components 14, 15 are joined together by rotating tool 11, and hence fastening screw 12, the corresponding nut 16 is tightened on threaded shaft 19. Fastening screw 12 is not moved axially in this case. Head 20 of fastening screw 12 is instead kept at a constant distance S from first component 14. Force accumulator 18 between tool 11 and first component 14 initially serves to maintain this distance S. Here a clamping force, which is absorbed by force accumulator 18, is developed by rotating tool 11. The size of the force absorbed by force accumulator 18 may be preset, thus enabling the desired clamping force of the finished screwed connection to be predetermined.

Distance S is maintained until the final clamping force is developed in the force accumulator. When fastening screw 12 sitting in tool 11 is further rotated, force accumulator 18 is compressed because its accumulator force is exceeded. This causes head 20 of fastening screw 12 to bear against first component 14. The connection between fastening screw 12 and tool 11 is then loosened, as a result of which the force stored in force accumulator 18 is transmitted as a clamping force to the finished screwed connection.

FIGS. 2 to 8 show a further exemplary embodiment of device 30 according to the invention. In this exemplary embodiment a wheel hub 60 will be connected to journal 70 (only denoted) of a drive shaft of a motor vehicle, not shown. Wheel hub 60 sits with a wheel hub collar 61 in a radial bearing 62. Wheel hub collar 61 has a drilled hole 65 with an axial inner toothing 66. Wheel hub 60 also has a wheel hub flange 63 with a plurality of axial drilled holes 64. Journal 70 is provided with a bolt 71 with an axial outer toothing 72. In the axial extension of bolt 71 a threaded pin 73 is connected. Bolt 71, with threaded pin 73, sits in a rotatably fixed manner in drilled hole 65 of wheel hub collar 61. Only the free end of threaded pin 73 projects from drilled hole 65. This arrangement is a force fit, which means that a joining force must be applied to tighten the threaded pin.

In order to make a fixed connection between wheel hub 60 and journal 70, a screwed connection must be made between the two components 60, 70 by screwing a fastening nut 55 onto threaded pin 73 and clamping it on wheel hub 70.

Device 30 according to the invention is used for this purpose.

Device 30 according to the invention has a tool 31 which consists of a socket wrench 32, a spherical clamping sleeve 33 and a locking nut 34. Locking nut 34 is provided with grips 34*a* and is fixedly connected by screwing to spherical clamping sleeve 33 and can be moved axially on the socket wrench of essentially cylindrical design by means of a trapezoidal thread 36 in the exemplary embodiment. This axial movement of spherical clamping sleeve 33 may also, for example, take place hydraulically or pneumatically. Spherical clamping sleeve 33 is therefore also axially moved by an axial sliding bearing 35 relative to socket wrench 32 with the axial movement of the locking nut. Socket wrench 32 has an outer polygon 32*a* at its end projecting into the open.

At the free end of socket wrench 32 is provided an axial recess 37 in which a housing 38 is installed for receiving fastening nut 55. Housing 38 is designed as an inner polygon corresponding to outer polygon 56 of fastening nut 55. Fastening nut 55 is therefore fixedly retained in the socket wrench.

So that fastening nut 55 does not fall out of socket wrench 32, a clamping device 39, with clamping elements, in this case clamping balls 40, is provided. Clamping device 39 is formed from the free end of socket wrench 32 and the free end of spherical clamping sleeve 33. The free end of the spherical clamping sleeve has a cutout 41 having an approximately quadrant shape (cf. FIG. 8).

Figure 9A:
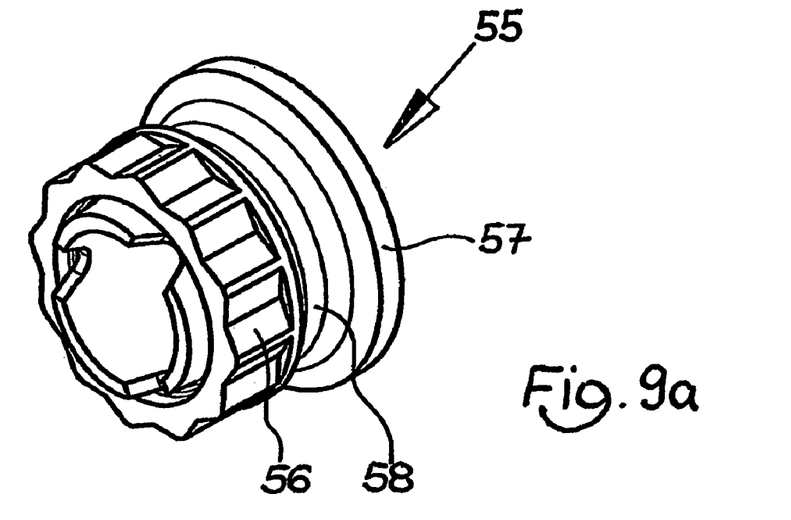
FIG. 9a shows a perspective representation of a first exemplary embodiment of a fastening nut.
Figure 9B:
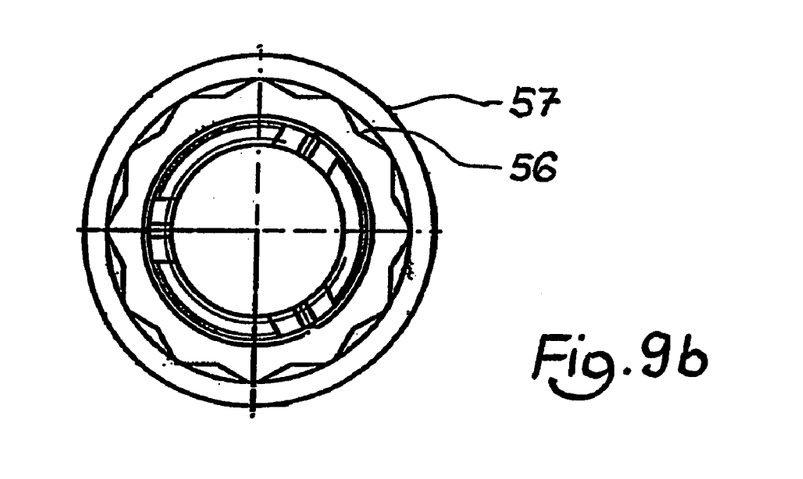
FIG. 9b shows the fastening nut from FIG. 9a in an elevation.
Figure 9C:
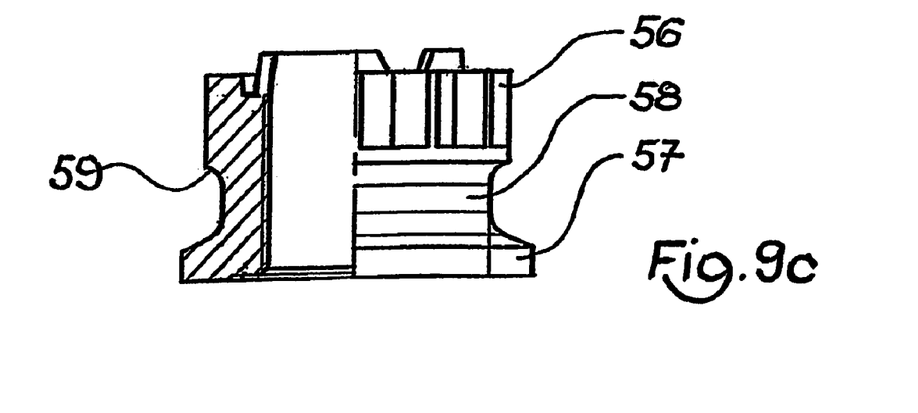
FIG. 9c shows the fastening nut from FIG. 9a in a partially cut representation.

An exemplary embodiment of a fastening nut 55 is shown in FIGS. 9*a* to 9*c* as a component part. It is provided with an outer polygon 56, a clamping shoulder 59, a contact flange 57 and an annular groove 58 formed between them.

When fastening nut 55 is inserted in housing 38 at the free end of the socket wrench, clamping balls 40 engage in this annular groove 58 and are supported on clamping shoulder 59, the free end of spherical clamping sleeve 33 covering the balls. By this means fastening nut 55 is retained in a clamping manner and hence axially immovably in socket wrench 32. The actuation of clamping device 39 may, for example, also be initiated automatically when fastening nut 55 is inserted.

Figure 10:
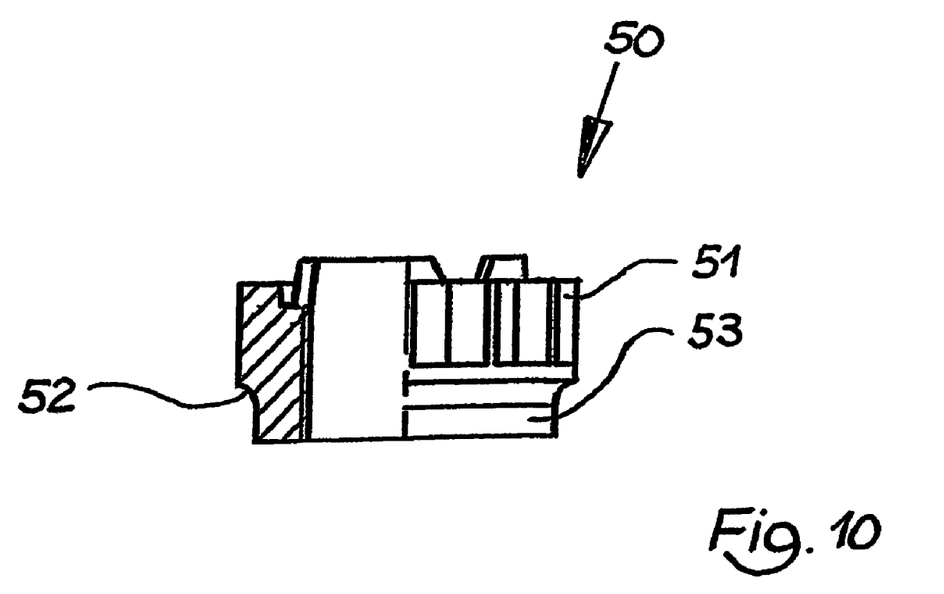
FIG. 10 shows a further exemplary embodiment of a fixing nut in a partially cut representation.

FIG. 10 shows a second exemplary embodiment of a fastening nut 50, which also has an outer polygon 51 and a clamping shoulder 52. An extended collar 53 is connected to clamping shoulder 52 in the axial extension of clamping shoulder 52 so that instead of an annular groove, an undercut is provided. Clamping elements can now lock the clamping shoulder. The advantage of such a fastening nut 50 is that it can be produced easily by pressing. There is no turning in of the annular groove.

Instead of clamping mechanics with clamping balls or other clamping elements, claws for example, fastening nut 50, 55 can also be retained with other suitable devices, e.g. with magnets. Since the support for fastening nut 50, 55 may be of any design, the shape of fastening nut 50, 55 is adapted to the support used, so that fastening nut 50, 55 may be of a highly variable design. The design of the region of fastening nut 50, 55 facing away from outer polygon 51, 56 is also adapted to the design of the components used in the individual case (as a contact flange 57 or collar 53 in the exemplary embodiments).

A bearing flange 42 is mounted on spherical clamping sleeve 33 by means of a grooved ball bearing 43. Axially aligned guide bolts 44, which are inserted in drilled holes 64 of wheel hub flange 63 and removably retain the entire device 30 on wheel hub 60, are fastened to the end of bearing flange 42 facing wheel hub 60. Spherical clamping sleeve 33 on bearing flange 42 is supported by an axial bearing 45.

A support flange 46 is arranged axially movably between bearing flange 42 and wheel hub 60 on guide bolt 44. Bearing bolts 47 are fixedly screwed in bearing flange 42. Support flange 46 is axially displaceable on bearing bolt 47. Force accumulators 48, designed as compression springs in the exemplary embodiment, are arranged between support flange 46 and bearing flange 42, which springs annularly surround bearing bolt 47. The force accumulators may obviously also be designed as hydraulic or pneumatic force accumulators. A distance ring 49 is arranged centrally as a spacer in support flange 47 on wheel hub 60 (cf. FIG. 7).

The process involved in the method according to the invention is now described with reference to FIGS. 2 to 6.

Figure 2:
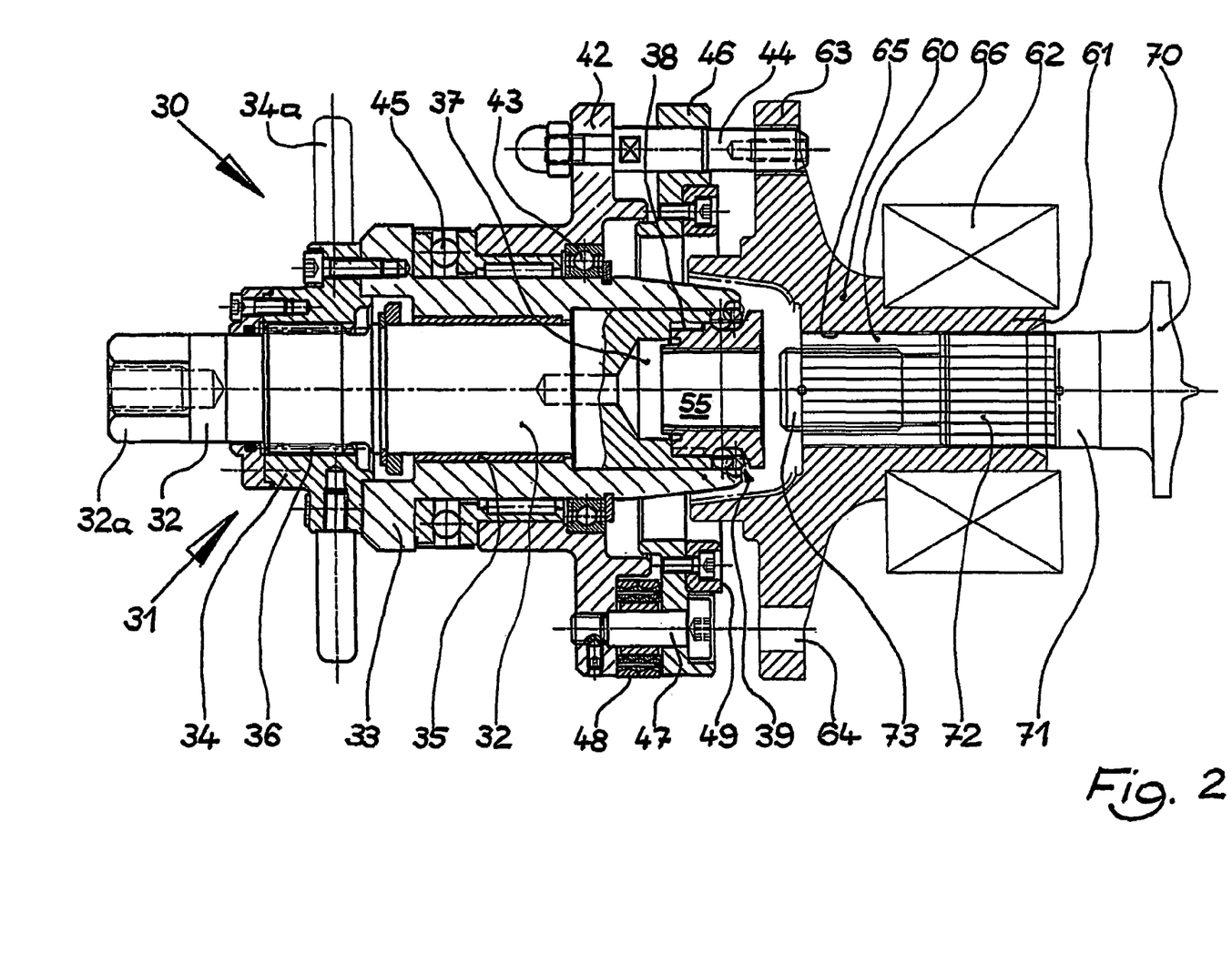
FIGS. 2 to 6 to show a sectional representation of a further exemplary embodiment of the 6device according to the invention in different phases of the method according to the invention.

In a first step, represented in FIG. 2, fastening nut 55 is inserted in housing 38 at the free end of socket wrench 32.

Spherical clamping sleeve 33 is displaced axially along socket wrench 32 by rotating locking nut 34. In the open position clamping balls 40 are inserted in cutout 41 and therefore have the clearance for a radial movement. Fastening nut 55 can now be inserted in housing 38. When spherical clamping sleeve 33 is displaced in the direction of wheel hub 60, the inner wall of the spherical clamping sleeve forces clamping balls 40 out of cutout 41 and into annular groove 58 of the fastening nut. Fastening nut 55 is now retained so that it cannot rotate and is axially immovable.

Figure 3:
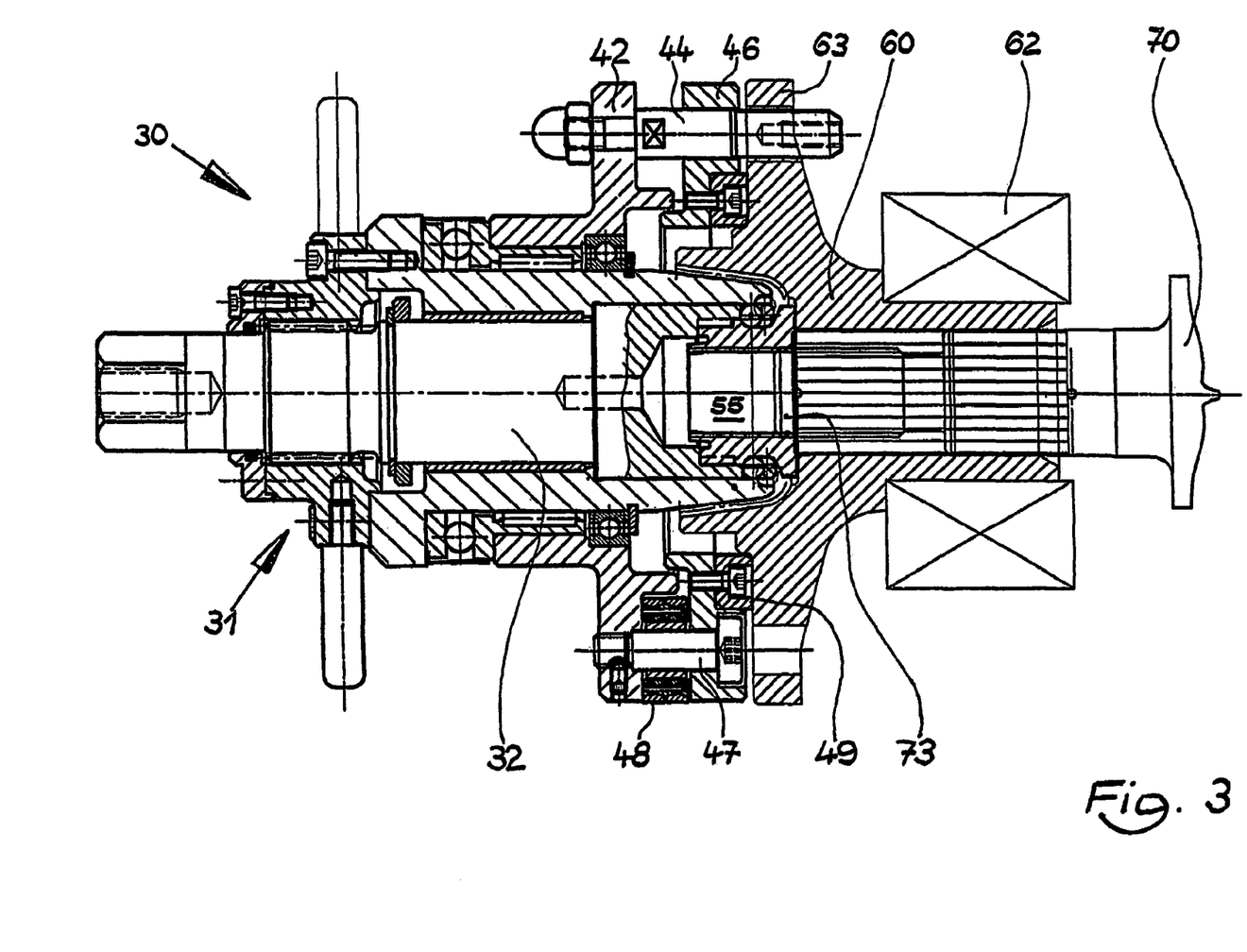

In the second step according to FIG. 3 device 30 according to the invention is placed on wheel hub flange 63. Here guide bolts 44 of bearing flange 42 are inserted in drilled holes 64 of wheel hub flange 63. Here fastening nut 55 approaches the free end of threaded pin 73 of bolt 71 of journal 70 projecting from drilled hole 65 until it comes into contact with the free end of threaded pin 73 and inches into position. The placing process is completed when distance ring 49 arranged on support flange 46 bears fixedly against wheel hub flange 63. Here there is still a distance between fastening nut 55 and wheel hub 60, i.e. fixing nut 55 does not rest on wheel hub 60.

Figure 4:
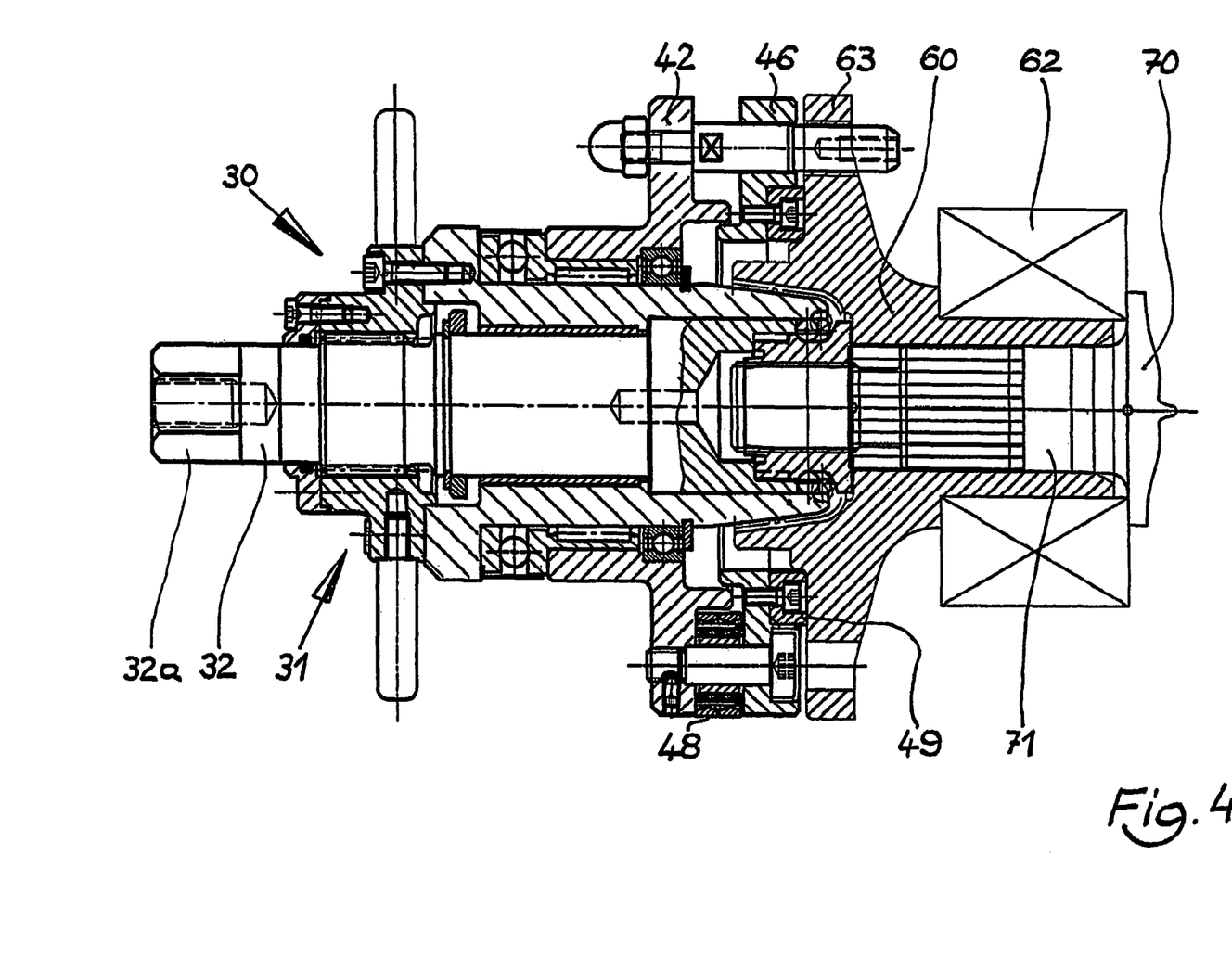

The third step according to FIG. 4 commences with the initiation of the tightening process. Tool 31 rotates when socket wrench 32 is rotated (application of a tool on outer polygon 32*a*), i.e. socket wrench 32, spherical clamping sleeve 33 and locking nut 34 rotate at the same angular velocity. Fastening nut 55 therefore also rotates without bearing against wheel hub 60. Bolt 71 of journal 70 is therefore tightened into wheel hub 60 until journal 70 is supported on wheel bearing 62. Distance S is approximately 0.5 mm in the exemplary embodiment.

The rotation of tool 31 may also be effected, for example, by hydraulic or pneumatic mechanisms.

Figure 5:
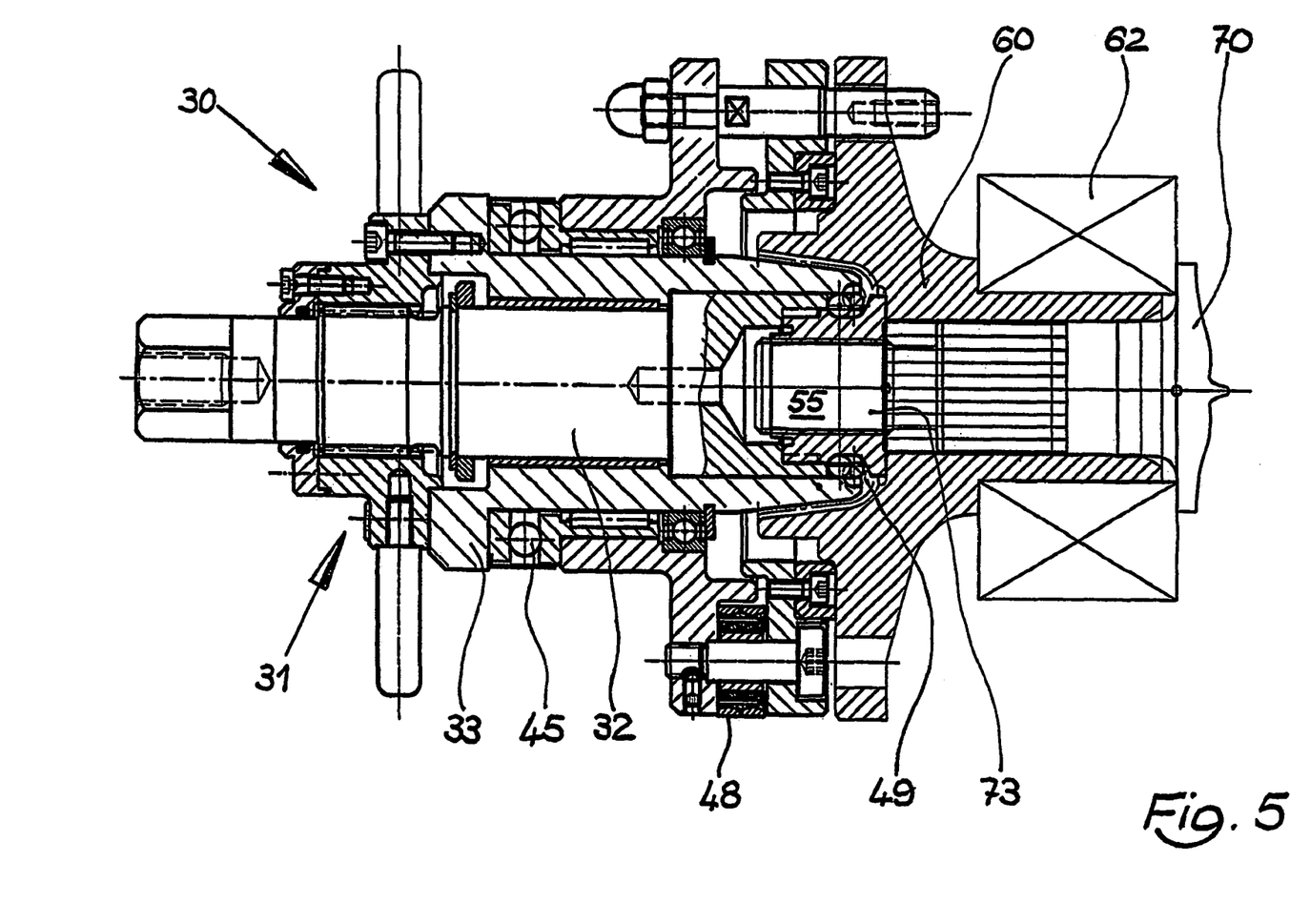

As soon as journal 70 is fully tightened and bears against wheel bearing 62, the joining process according to FIG. 5 is completed. The rotation of socket wrench 32 is now continued without interruption, with an increase in the torque and clamping force. As soon as the clamping force is greater than the accumulator force of force accumulator 48 (40 kN in the exemplary embodiment), fastening nut 55 is brought to bear against wheel hub 60 by the compression of force accumulator 48. Gap S (approx. ½ mm in the exemplary embodiment) is closed. The accumulator force of the force accumulator 48 is therefore greater than the joining force and in the extreme case corresponds to the required clamping force of the finished screwed connection (cf. FIG. 1).

Up to this point friction losses only take place in the form of the threading friction between fastening nut 55 and threaded pin 73. Fastening nut 55 does not rest on wheel hub 60, so that no head friction occurs. The surface of wheel hub 60 is not impaired in the contact region and uncontrollable variation of the coefficient of friction is avoided.

Journal 70 now bears against wheel bearing 62, and fastening nut 55 bears against wheel hub 60. This means that in the joint there is no longer a free passage for an axial movement. The tightening process for journal 70 is completed, but the actual clamping of fastening nut 55 has not yet taken place. The tightening process and the clamping process are separate processes, with the result that the introduction of force into the system can take place in a controlled manner, i.e. without influencing the head friction.

The actual clamping process now commences by rotating socket wrench 32 even further, although there is no longer a free passage for an axial movement. Socket wrench 32 generally no longer performs a full rotation. Fastening nut 55 is now still rotating about a small angle range on the surface of wheel hub 60 in the exemplary embodiment. A head friction is now only generated over this small angle range, so that the surface of wheel hub 60 remains practically unimpaired in this range. The size of the angle range depends on the dimensioning in the individual case, but may typically be 100° to 220°.

Figure 6:
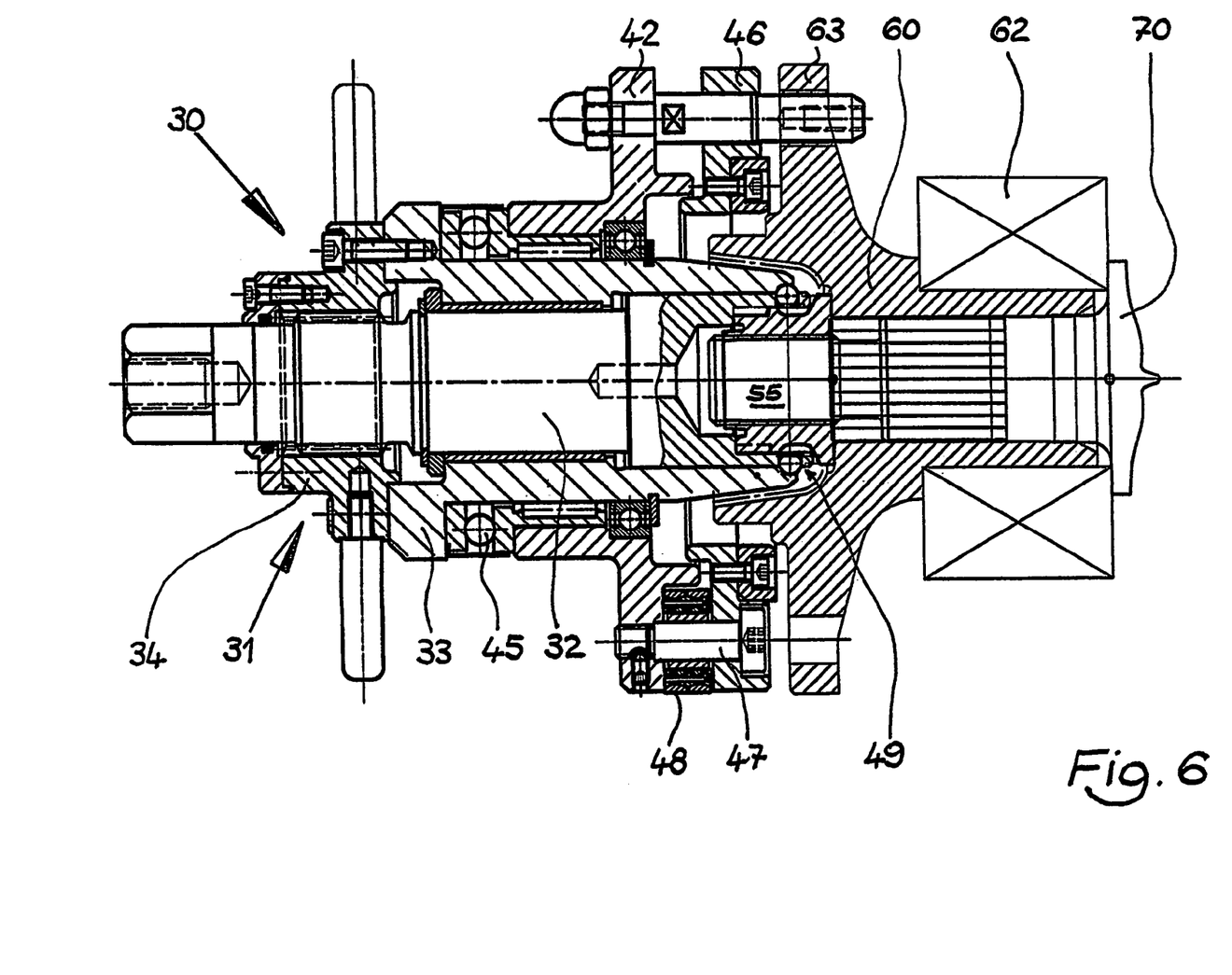
Figure 7:
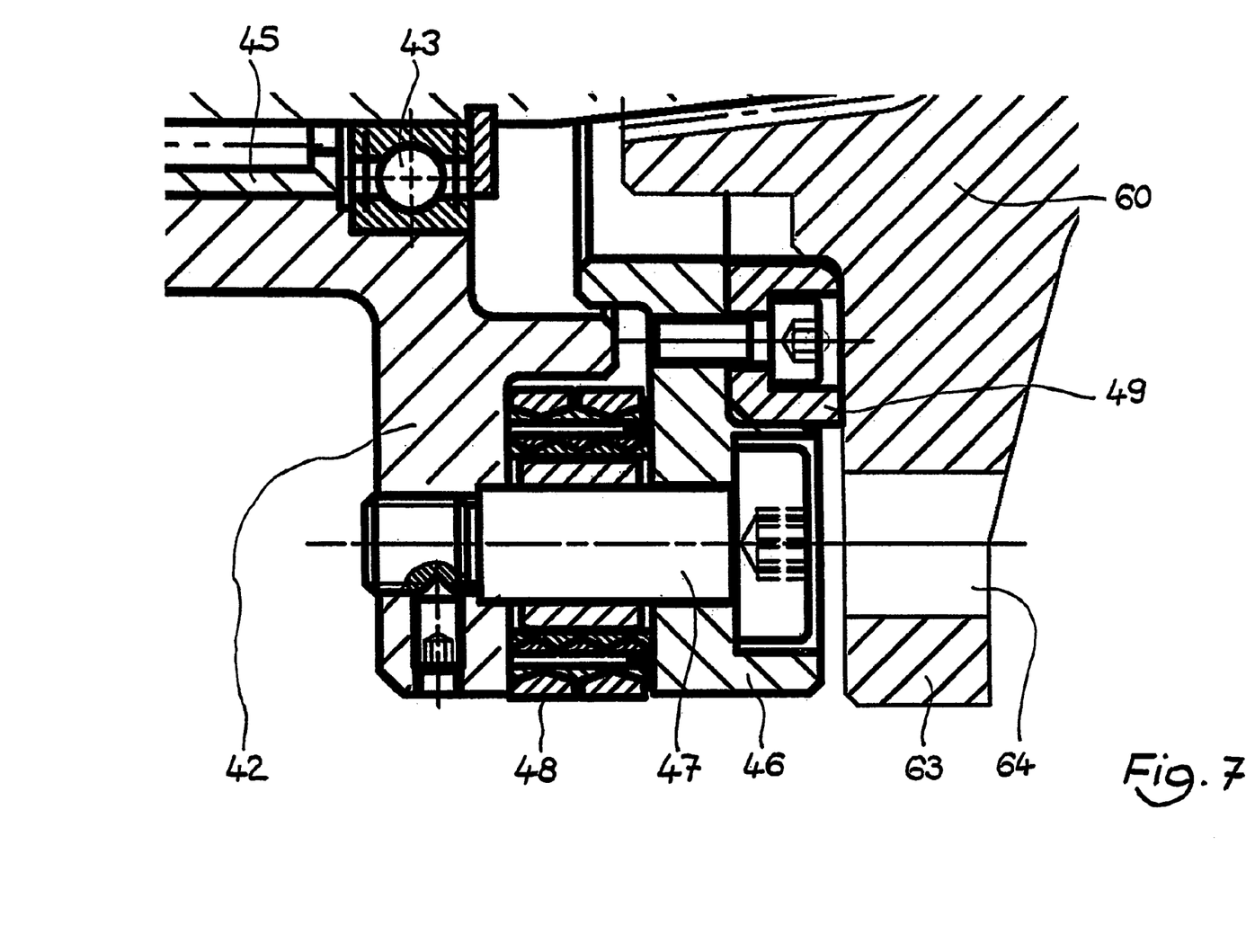
FIG. 7 shows an enlarged detailed view of the force accumulator from FIGS. 2 to 6.
Figure 8:
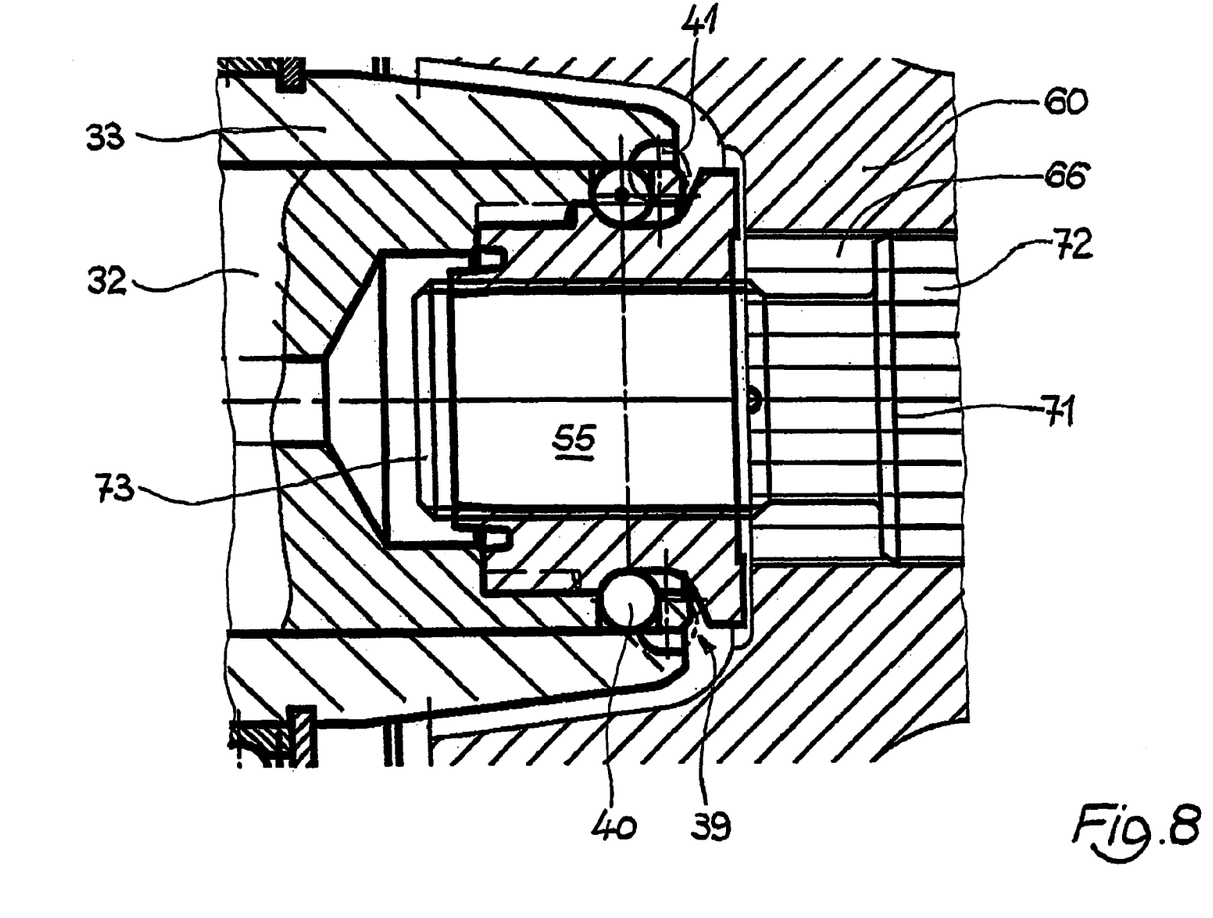
FIG. 8 shows an enlarged detailed view of a fastening nut in the tool from FIGS. 2 to 6.

In the last step, shown in FIG. 6, the clamping of fastening nut 55 is loosened by pulling back spherical clamping sleeve 33 by rotating locking nut 34. Clamping device 49 is therefore loosened. The fastening nut is released from tool 31. The tool is now pulled off. The assembly process is completed.

The forces and moments generated in the method according to the invention can obviously be determined by measurement, evaluated and stored. They are therefore individually available for any assembly process.

The device according to the invention and the method according to the invention enable at least one predefined joining force to be applied, a maximum of the total required clamping force, to a screwed connection. In this case the rotation process can be continued from the first to the last step without interruption so that in principle the method can be automated. If the total required clamping force is applied free of friction (cf. FIG. 1), the head friction is completely eliminated. This means that the actual screwing tools can be dimensioned smaller, at least for joining together the components, and also for the clamping in the exemplary embodiment according to FIG. 1, because a lower torque than previously has to be applied.

The device and method according to the invention are obviously suitable not only for the axle assembly of motor vehicles, but they may also be applied to all screwed connections of components, for example on wind force systems or in ring flange pipes in the chemical industry.

The invention claimed is:

1. A device for making a screwed connection between a first component and at least one further component by means of a fastening screw having a head or by means of a fastening nut and by means of a corresponding fastening element, wherein the device comprises a tool, wherein said tool is supported on the first component, wherein said tool is rotatably mounted by a bearing, wherein the fastening screw or the fastening nut is retained in said tool so that said fastening screw or said fastening nut cannot rotate and is axially fixed, wherein at least one force accumulator is provided between the tool and the first component, wherein said at least one force accumulator is designed as a device that can be compressed and expanded by a distance, wherein said at least one force accumulator is designed as a device that can be compressed and expanded in the direction of joining of the components, wherein said at least one force accumulator is designed to absorb a predetermined clamping force, said clamping force being developed by rotation of the tool, wherein said at least one force accumulator is designed as a device that is compressed in case that the clamping force developed by rotation of the tool exceeds the defined clamping force which can be absorbed by the force accumulator.

2. The device according to claim 1, wherein the tool is supported on the first component by an axial bearing on a bearing flange.

3. The device according to claim 2, wherein the bearing flange is mounted on the tool.

4. The device according to claim 1, wherein the at least one force accumulator is designed as a mechanically operating device.

5. The device according to claim 1, wherein the at least one force accumulator is designed as a hydraulically or pneumatically operating device.

6. The device according to claim 1, wherein the at least one force accumulator is provided between a bearing flange mounted on the tool and a support flange arranged between the bearing flange and the first component.

7. The device according to claim 6, wherein the support flange is axially movable on guide bolts fastened to the bearing flange.

8. The device according to claim 6, wherein the at least one force accumulator is arranged around at least one bearing bolt and the support flange is axially movable on the at least one bearing bolt.

9. The device according to claim 6, wherein the support flange has on its surface facing the first component at least one spacer.

10. The device according to claim 1, wherein the tool is composed of a socket wrench, a spherical clamping sleeve and a locking nut.

11. The device according to claim 10, wherein the tool is rotatable by rotating the socket wrench.

12. The device according to claim 10, wherein the spherical clamping sleeve is axially displaceable along the socket wrench by rotating the locking nut.

13. The device according to claim 10, wherein the free end of the socket wrench has an axial recess with a housing for receiving a fastening nut.

14. The device according to claim 10, wherein the free end of the socket wrench and the free end of the spherical clamping sleeve form a clamping device for a fastening screw or a fastening nut.

15. The device according to claim 14, wherein the clamping device is provided with clamping elements.

16. The device according to claim 15, wherein the free end of the spherical clamping sleeve has a cutout, and wherein the clamping elements are fixed when the spherical clamping sleeve is axially displaced in one direction and the fastening screw or the fastening nut is retained in a clamping manner, and wherein the clamping elements rest in the cutout when the spherical clamping sleeve is axially displaced in the opposite direction, and the fastening screw or the fastening nut is released.

17. A fastening nut for a device according to claim 1, with an outer polygon, wherein a clamping shoulder is provided adjacent to the outer polygon.

18. The fastening nut according to claim 17, wherein the clamping shoulder is formed by an annular groove.

19. A method for making a screwed connection between a first component and at least one further component by means of a fastening screw having a head or by means of a fastening nut and by means of a corresponding fastening element, wherein the fastening element is pulled onto the fastening screw or tightened into the fastening nut by rotating the fastening screw or the fastening nut until the two components are joined together, during which step the head of the fastening screw or the fastening nut is retained at a distance from the first component, wherein at least the joining force or the total required clamping force of the finished screwed connection is predetermined by means of a force accumulator, wherein the force developed by rotating the fastening screw or the fastening nut is absorbed by and stored in the force accumulator, wherein, after the two components are joined together, the fastening screw or the fastening nut is then tightened until it bears against the first component, by moving the head of the fastening screw or the fastening nut in a direction of the first component as soon as the force developed by rotating the fastening screw or the fastening nut exceeds the predetermined clamping force which can be absorbed by the force accumulator, wherein the force stored in the force accumulator is transmitted to the finished screwed connection after the clamping of the fastening screw or the fastening nut.

* * * * *